United States Patent
Döbbeler et al.

(10) Patent No.: US 9,949,322 B2
(45) Date of Patent: Apr. 17, 2018

(54) METHOD FOR OPERATING AN ELECTRIC ARC FURNACE AND MELTING PLANT HAVING AN ELECTRIC ARC FURNACE OPERATED ACCORDING TO SAID METHOD

(75) Inventors: Arno Döbbeler, Herzogenaurach (DE); Dieter Fink, Bubenreuth (DE); Detlef Rieger, Baldham (DE)

(73) Assignee: PRIMETALS TECHNOLOGIES GERMANY GmbH, Erlangen (DE)

( * ) Notice: Subject to any disclaimer, the term of this patent is extended or adjusted under 35 U.S.C. 154(b) by 1044 days.

(21) Appl. No.: 14/233,886

(22) PCT Filed: Jul. 12, 2012

(86) PCT No.: PCT/EP2012/063630
§ 371 (c)(1),
(2), (4) Date: Jan. 21, 2014

(87) PCT Pub. No.: WO2013/010891
PCT Pub. Date: Jan. 24, 2013

(65) Prior Publication Data
US 2014/0185645 A1 Jul. 3, 2014

(30) Foreign Application Priority Data
Jul. 19, 2011 (EP) .................................. 11174514

(51) Int. Cl.
*H05B 7/148* (2006.01)
*F27B 3/28* (2006.01)
(Continued)

(52) U.S. Cl.
CPC ............. *H05B 7/148* (2013.01); *F27B 3/085* (2013.01); *F27B 3/20* (2013.01); *F27B 3/28* (2013.01);
(Continued)

(58) Field of Classification Search
CPC ... F27B 3/085; F27B 3/20; F27B 3/28; H05B 7/144; H05B 7/148; C21C 5/5205;
(Continued)

(56) References Cited

U.S. PATENT DOCUMENTS 5,533,044 A * 7/1996 Strebel ................. H05B 7/156
373/104
5,610,937 A * 3/1997 Gaupp ................. C21C 5/5229
373/102

(Continued)

FOREIGN PATENT DOCUMENTS

RU            2 190 815         10/2002
WO         2007/009924          1/2007
(Continued)

OTHER PUBLICATIONS

Bjorn Dittmer, "Asymmetrical Power Control of AV-EAF by Structure-Borne Sound Evaluation", Iron & Steel Technology Conference 2010, Pittsburgh, May 2010, pp. 937-945.*
(Continued)

*Primary Examiner* — Hung D Nguyen
(74) *Attorney, Agent, or Firm* — Staas & Halsey LLP

(57) ABSTRACT

In a method for operating an electric arc furnace operated with an alternating voltage, a structure-borne sound signal occurring on a wall of the electric arc furnace is detected, from which structure-borne sound signal a parameter characterizing the flicker properties of the electric arc furnace is calculated. At least one process variable of the electric arc furnace is controlled on the basis of the calculated parameter. An electric arc furnace operated according to the method is used in and for a melting plant.

12 Claims, 1 Drawing Sheet

(51) Int. Cl.
*F27B 3/08* (2006.01)
*F27B 3/20* (2006.01)
*F27D 99/00* (2010.01)

(52) U.S. Cl.
CPC ..... *F27D 2099/0021* (2013.01); *Y02P 10/256* (2015.11); *Y02P 10/259* (2015.11)

(58) Field of Classification Search
CPC ... C21C 5/5211; C21C 5/5217; C21C 5/5294; C21C 5/4673; C21C 5/54; F27D 2099/0021; F27D 21/00; F27D 19/00; F27D 13/002; Y02P 10/259; Y02P 10/256
USPC ........ 373/44, 45, 46, 49, 60, 63, 66, 78, 79, 373/81, 88, 102, 104, 105, 109; 75/386, 75/10.12, 10.13, 375; 266/78, 80, 81, 90
See application file for complete search history.

(56) References Cited

U.S. PATENT DOCUMENTS

| | | | |
|---|---|---|---|
| 6,603,795 B2* | 8/2003 | Ma | H05B 7/148 373/102 |
| 8,412,474 B2 | 4/2013 | Doebbeler et al. | |
| 2006/0050758 A1* | 3/2006 | Sedighy | F27B 3/28 373/102 |
| 2008/0285615 A1 | 11/2008 | Fink | |
| 2008/0307926 A1* | 12/2008 | Matschullat | C21C 5/5211 373/49 |
| 2011/0007773 A1 | 1/2011 | Doebbeler et al. | |

FOREIGN PATENT DOCUMENTS

| | | |
|---|---|---|
| WO | 2008/034701 | 3/2008 |
| WO | 2009/095292 | 8/2009 |
| WO | 2009/095396 | 8/2009 |

OTHER PUBLICATIONS

European Office Action for European Priority Application No. 11174514.7, dated Nov. 28, 2011.
English language translation of International Search Report for PCT/EP2012/063630, dated Sep. 11, 2012, 3 pages.
IEC/TR 61000-3-7 Technical Report, Edition 2.0, Feb. 2008, "Electromagnetic compatibility (EMC)—Part 3-7: Limits—Assessment of emission limits for the connection of fluctuating installations to MV, HV and EHV power systems," (70 pages total).
Machine generated English language translation of Bjoern Bittmer et al., "Process state detection of electric arc furnaces by structure-borne sound evaluation," Metallurgie, Stahl und Eisen 129, No. 12, 2009, pp. 33-34, 36, and 38-41 (originally submitted without translation in Information Disclosure Statement of Jan. 16, 2014).
Machine generated English language translation of Monika Boh et al., "Practical results of a foaming slag manager in operation at Lech-Stahlwerke," Metallurgie, Stahl und Eisen 130, No. 4, 2010, pp. 65-66, 68, and 70-71 (originally submitted without translation in Information Disclosure Statement of Jan. 16, 2014).
Notice of Allowance dated Sep. 14, 2016 in corresponding Russian Patent Application No. 2014106073.

\* cited by examiner

METHOD FOR OPERATING AN ELECTRIC ARC FURNACE AND MELTING PLANT HAVING AN ELECTRIC ARC FURNACE OPERATED ACCORDING TO SAID METHOD

CROSS REFERENCE TO RELATED APPLICATIONS

This application is based on and hereby claims priority to International Application No. PCT/EP2012/063630 filed on Jul. 12, 2012 and European Application No. 11174514.7 filed on Jul. 19, 2011, the contents of which are hereby incorporated by reference.

BACKGROUND

The invention relates to a method for operating an electric arc furnace. In addition, the invention relates to a smelting plant with an electric arc furnace operated in accordance with this method.

In an electric arc furnace, pieces of material to be melted down, generally scrap metal, are melted, if necessary together with further additives, by an electric arc which is struck between the material to be melted and at least one electrode.

It has been found that unwanted disturbances of the mains supply are produced, above all, by electric arc furnaces which are fed practically exclusively with scrap. For this purpose, therefore, steel works install compensation systems, so-called SVC systems or static reactive power compensators, in order to reduce such mains supply disturbances as harmonic waves or so-called flicker, and to adhere to internationally prescribed limiting values. However, such SVC-systems react only with a lag to a mains disturbance which has already been produced, i.e. to the harmonic waves or flicker generated in the electric arc furnace during the melting down of scrap, and, particularly if the electric arc furnaces are operated on weak supply networks, cannot ensure that the prescribed limiting values are adhered to.

From the related art, a known way of avoiding high flicker values is to feed the scrap in as a mixture with a low so-called Kst value. In accordance with IEC standard 61000-3-7, this Kst value specifies the nature, weight and density of the scrap, and as a rule lies between 48 and 85. In addition to this, so-called supplementary reactances are incorporated in the furnace circuit, for example a furnace transformer restrictor, and control engineering parameterization is effected for the purpose of stabilizing the electric arc. Newer SVC systems, based on IGBT technology, are also utilized if a large improvement in the flicker values is required. Using SVC systems of this type, the frequency spectrum of the disturbance which is produced is transformed to a higher frequency range, so that it no longer falls within the measurement region laid down by the international norms for flicker disturbance to the mains supply. However, these measures involve either high investment costs or on the other hand production losses. Over and above this, it is not only the composition of the scrap and its quality which affects the disturbances of the mains supply. Rather, it is the case that the manner of operation during the melting down of the scrap also has such an influence. Thus, for example, movements of the scrap and collapsing of the scrap pile can produce disturbances of the mains supply. However, the detection of scrap movements and collapses of the scrap is largely the responsibility of the operating staff, so that regulation of the electrodes for these events is only retrospectively possible, i.e. as a reaction after a movement of the scrap has occurred and disturbances of the mains supply have already arisen.

SUMMARY

One possible object is therefore to specify a method for the operation of an electric arc furnace with which it is possible to recognize automatically the nature of the scrap and its density, and movements and collapses of the scrap, in order to be able to predict occurrences of flicker which are attributable to the scrap density and movements of the scrap, and automatically to be able to take them into account in the management of the process variables of the electric arc furnace. An additional possible object is to specify a smelting plant with an electric arc furnace operated in accordance with this method.

The inventors propose a method for an electric arc furnace operated using an alternating voltage. In the method a structure-borne sound signal S is detected on a wall of the electric arc furnace, from this is calculated a parameter K which characterizes the flicker properties of the electric arc furnace, and this calculated parameter K is used in controlling at least one process variable of the electric arc furnace.

Here, the proposal is based on the experience that large flicker values or high Kst values, as applicable, are produced either by a large movement of the melting scrap or by the presence of large pieces of heavy scrap under the electric arc. In the former case, new cold scrap slips underneath the electrodes and, depending on the conditions, major and rapid readjustments must be made to the electric arc. As a result, the current and the burning conditions change abruptly. In the second case, the burning of the electric arc is unstable and has a fluctuating root.

It is already known in principle, from WO 2009/095292 A1 and WO 2009/095396 A1, that from measurements of structure-borne sound at the wall the electric arc furnace, taking into account also the progress over time of current and voltage, it is possible to extract signals which characterize a movement of the scrap or relocation of the scrap and a change in the mass at the wall of the electric arc furnace. However, the proposal is based on the consideration that it is possible to calculate, by a specialized analysis of the structure-borne sound signal(s) arising at the wall of the electric arc furnace, a parameter K which is suitable for detecting predictively the flicker properties of the electric arc furnace. In doing so, it is preferable to calculate as the parameter K a characteristic value which is comparable with a Kst value.

In particular, the structure-borne sound signal S is subjected to a Fourier transformation, and amplitudes are determined for the Fourier transform F of the structure-borne sound signal S at a plurality of frequencies f, from which the parameter K is then calculated. This approach takes into account the observation that in the case of relocation of the scrap or in particular collapses of the scrap pile, both very low and also very high frequency oscillations occur, which are independent of the oscillations of the electric arc induced by its operation with an alternating voltage, and which are an integral multiple of a fundamental frequency $f_0$, which is 100 Hz when the operating frequency is 50 Hz. Over and above this, experience shows that the stability of the electric arc is also affected by the heavy scrap content, so that unstable burning of the electric arc when the scrap is not moving permits conclusions to be drawn as to the heavy scrap content, which in turn is a cause of unwanted flicker. Accordingly, in a preferred form of the method a determination is made, from the amplitudes of the Fourier transform F at frequencies f which lie below the fundamental frequency $f_0$, of a measure B for a low frequency scrap movement and, from the amplitudes of the Fourier transform F at frequencies f which lie above the fundamental frequency $f_0$ and which do not include the harmonic frequencies, of a measure E for high-frequency vibration, and from the amplitudes of the Fourier transform F at harmonic frequencies and frequencies f lying between the harmonic frequencies of a measure SSG which characterizes the heavy scrap content, from which the parameter K is calculated.

In a particularly preferred form of the method, the parameter K is determined using the following relationships:

$$SV = B*E \qquad (1)$$

where $$B = \sum_{n=n0}^{n1} F^{-\alpha}(f_n) \qquad (2)$$

and $1 \leq \alpha \leq 10$ where $f_{n1} < f_0$ and $f_{n+1} - f_n = \Delta f \ll f_0$ and using $$E = \sum_{n=n2}^{n3} F^{\beta}(f_n) \qquad (3)$$

where $f_n \neq m*f_0$ and $f_{n2} > f_0$, $2 \leq \beta \leq 10$ and m is a natural number,
and $$SSG = \left(\sum_{k=2}^{k_{max}} F(kf_0)\right) * \left(\sum_{n} F(f_n)\right) \bigg/ F^2(f_0) \qquad (4)$$

where $f_n \neq m*f_0$ and $f_n > f_0$, where k and m are natural numbers and $f_n$ are the frequencies used in equation (3) and $k_{max} \leq 10$ applies,
and the parameter K is calculated using the equation $$K = a*SV + b*SSG \qquad (5)$$

where a and b are experimentally determined weighting factors.

The inventors also propose a smelting plant having an electric arc furnace operated according to the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
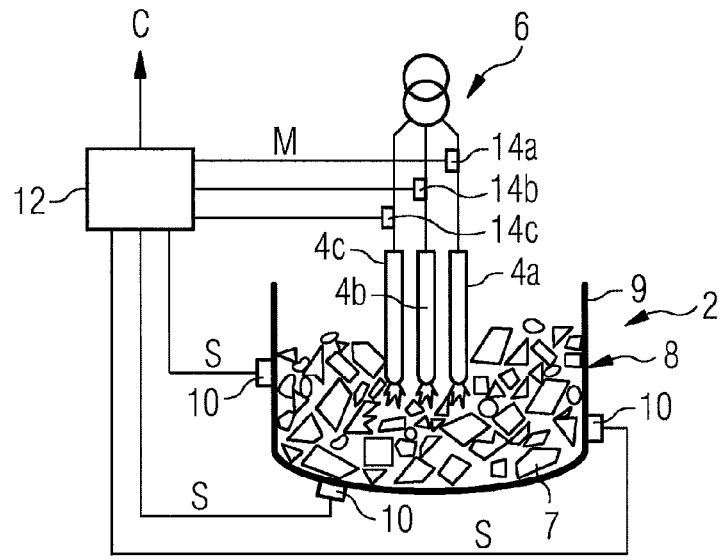
FIG. 1 a schematic diagram of the principle of a proposed smelting plant.

Reference will now be made in detail to the preferred embodiments of the present invention, examples of which are illustrated in the accompanying drawings, wherein like reference numerals refer to like elements throughout.

As shown in FIG. 1, a smelting plant proposed by the inventors incorporates an electric arc furnace 2 with, for example, three electrodes 4a-c, which are connected electrically to the furnace transformer of a power supply facility 6. The electrodes 4a-c project down into a furnace vessel 8, which holds the scrap 7 which is to be melted down, on the wall 9 of which are arranged a plurality of structure-borne sound sensors 10. The structure-borne sound signals S detected by the structure-borne sound sensors 10 are communicated to a control and analysis facility 12 for further processing.

In addition to the structure-borne sound signals S, the current flowing in the electrodes 4 and/or the voltage across them are/is measured with the aid of measuring sensors 14a-c, and the corresponding measurement signals M are communicated to the control and analysis facility 12. In this control and analysis facility, control signals C are generated, with which at least one process variable of the electric arc furnace 2 is controlled or regulated.

Figure 2:
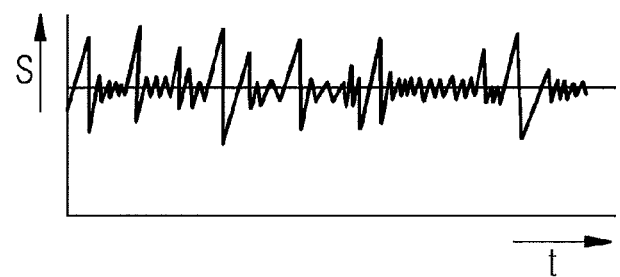
FIG. 2 a diagram in which the measured structure-borne sound signal is plotted against time, FIG. 3 a diagram in which the amplitude of the Fourier transform of the structure-borne sound signal is plotted against frequency.
Figure 3:
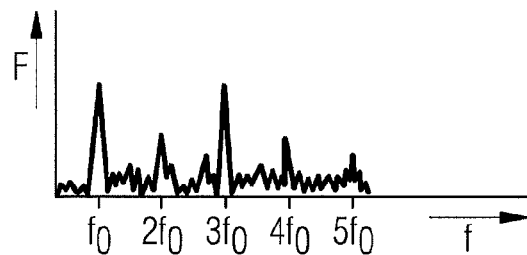

In the diagram in FIG. 2, an example of a structure-borne sound signal S, measured using a structure-borne sound sensor 10, is plotted against the time t, where in principle the structure-borne sound signals S generated by several structure-borne sound sensors 10 could be combined into one summary signal. From this structure-borne sound signal S, the frequency spectrum is now determined by a Fourier transformation (FFT), this being illustrated in FIG. 3, in which the amplitude of the Fourier transform F is plotted against the frequency f. In this FIG. 3 it can be seen that the magnitude (amplitude) of the Fourier transform F has significant maxima for the frequencies $f_0$, $2f_0$, $3f_0$, $4f_0$ and $5f_0$, the height of which decreases with increasing frequency f. These maxima lie at harmonic frequencies $mf_0$ of a fundamental frequency $f_0$, i.e. they correspond to integer multiples of this fundamental frequency $f_0$, the value of which is double the frequency (operating frequency) of the voltage by which the electrodes are operated. For an operating frequency of 50 Hz, these harmonic frequencies $f_0$ are at 100, 200, 300, 400 or 500 Hz.

From the Fourier transform F it is now possible to calculate a measure of the scrap relocation SV from the product formed from a measure B of a low-frequency scrap movement and a measure E of a high-frequency scrap vibration $$SV = B \cdot E \qquad (1)$$

using the following relationships:
with $$B = \sum_{n=n0}^{n1} F^{-\alpha}(f_n) \qquad (2)$$

where $f_{n1} < f_0$ and $f_{n+1} - f_n = \Delta f \ll f_0$

A suitable value for $f_{n0}$ is, for example, 1 Hz. As the upper limit $f_{n1}$, a suitable value is one which lies well below the fundamental frequency $f_0$, preferably below the operating frequency $f_0/2$ and in the example has a value of 30 Hz, where the amplitudes of the Fourier transform F at frequencies of $f_n$ are raised to the power of $-\alpha$ and summed, these frequencies being spaced at $\Delta f=1$ Hz, corresponding to a frequency resolution which can typically be achieved by a fast Fourier transform. The parameter $\alpha$ is such that: $1 \leq \alpha \leq 10$, where it has been found that a suitable value is $\alpha = 1$.

$$E = \sum_{n=n2}^{n3} F^\beta(f_n) \qquad (3)$$

where $f_n \neq m^*f_0$ and $f_{n2} > f_0$ with $2 \leq \beta \leq 10$ and m is a natural number.

For the purpose of calculating the measure E for the vibration, the amplitudes of the Fourier transform F at intermediate frequencies $f_n \neq m^*f_0$ are raised to the power of $\beta$ and summed, these frequencies being spaced far enough from the harmonic frequencies that the latter make no contribution to the magnitudes of the amplitudes used.

Since the electric arc burns unstably and with a fluctuating root for cold heavy scrap, the spectrum of the structure-borne sound which is produced, i.e. the Fourier transform F, has not only greatly raised amplitudes at the higher harmonic frequencies $mf_0$ but also a large number of maxima at intermediate frequencies lying between the harmonic frequencies $mf_0$. A measure SSG for the heavy scrap content can therefore be advantageously determined using the following relationship.

$$SSG = \left( \sum_{k=2}^{k_{max}} F(kf_0) \right) * \left( \sum_i F(f_i) \right) / F^2(f_0) \qquad (4)$$

where $f_n \neq m^*f_0$ and $f_n > f_0$, where k and m are natural numbers and fn are the frequencies used in equation (3) and $k_{max} \leq 10$ applies.

From the measure SV for the scrap relocation, and the measure SSG for the heavy scrap content, it is now possible to determine a parameter K by applying the weightings a and b in the relationship $$K = a^*SV + b^*SSG \qquad (5)$$

where the weights a, b are determined experimentally from the correlation of the value calculated in this way and the flicker actually measured, and are adjusted in such a way that the dynamic parameter K determined in this way is comparable with a Kst value. In this way it is thus possible, during the initial melting down process, to calculate a parameter K, which is correlated with the Kst value, which specifies the current scrap movement and the current scrap status. This calculated parameter K does not correspond exactly to the Kst value as defined in the IEC standard cited above, but does correctly reflect the progress and trend and can thus be used optimally for flicker prediction and for setting the regulation system to avoid flicker.

Taking into account further data, in particular the progress of the current and voltage, the wall temperatures and/or the specific energy injected, it is now possible to create a higher level complete regulation system for the purpose of process management, with which a rapid and status-oriented reaction to the dynamic changes taking place in the electric arc furnace is possible. Such a control or regulation system, as applicable, will preferably work on the voltage stage of the furnace transformer, the impedance or current set-points for the electrode regulation system, the additional reactances and the issuing of set-point values for the burners and lances. As a basis for this, it is possible to use the values in a permanently stored operating diagram, which the regulation system changes dynamically within prescribed limits. The measurement of the dynamic changes in the scrap during the melting down process in the electric arc furnace is combined with a higher-level, modular regulation system, for example based on fuzzy-logic, for process energy management of the electric arc furnace, which prescribes the electrical working point and the set-point values for the burner and lance systems. This permits dynamic status-oriented intervention in the smelting process. By using a complete regulation concept based on linguistic fuzzified rules and further analytical balancing, using among other things an analytical model of the load distribution, the smelting process can be adjusted so that the flicker does not exceed prescribed limiting values.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating an alternating voltage electric arc furnace, comprising:
    detecting, by a structure-borne sound sensor arranged on a wall of the electric arc furnace, a structure-borne sound signal arising at the wall;
    calculating a parameter which predicts a flicker value of the electric arc furnace, the parameter being calculated based on the structure-borne sound signal, wherein the flicker value corresponds to a variation in light intensity from a light source over time caused by fluctuations of voltage in the electric arc furnace; and
    controlling a process variable for the electric arc furnace by reference to the parameter to avoid flicker.

2. The method as claimed in claim 1, wherein the parameter is a numeric measure related to a Kst value, the Kst value specifying characteristics, including at least one of weight and density, of scrap metal disposed in the electric arc furnace.

3. The method as claimed in claim 2, wherein calculating the parameter comprises:
    subjecting the structure-borne sound signal to a Fourier transformation;
    determining amplitudes of the Fourier transform at a plurality of frequencies; and
    calculating the parameter from the amplitudes.

4. The method as claimed in claim 3, wherein
    a measure for a low-frequency scrap movement is calculated from amplitudes of the Fourier transform at frequencies f which lie below a fundamental frequency $f_0$,
    a measure for a high frequency vibration is calculated from amplitudes of the Fourier transform at frequencies f which lie above the fundamental frequency $f_0$ and do not include harmonic frequencies $mf_0$,
    a measure which characterizes stability of the electric arc is calculated from amplitudes of the Fourier transform at frequencies f which lie at and between the harmonic frequencies $mf_0$, and
    the parameter is calculated from the measures.

5. The method as claimed in claim 4, wherein the parameter is determined using:

$$SV = B * E \quad (1)$$

where $$B = \sum_{n=n0}^{n1} F^{-\alpha}(f_n) \quad (2)$$

where B is the measure for a low-frequency scrap movement, where E is the measure for a high frequency vibration, where F is the Fourier transform, where $f_{n1} < f_0$ and $f_{n+1} - f_n = \Delta f \ll f_0$
and where $$E = \sum_{n=n2}^{n3} F^{\beta}(f_n) \quad (3)$$

where $f_n \neq m^*f_0$ and $f_{n2} > f_0$, $2 \leq \beta \leq 10$ and m is a natural number,
and $$SSG = \left(\sum_{k=2}^{k_{max}} F(kf_0)\right) * \left(\sum_n F(f_n)\right) \bigg/ F^2(f_0) \quad (4)$$

where SSG is the measure which characterizes stability of the electric arc, where $f_n \neq m^*f_0$ and $f_n > f_0$, where k and m are natural numbers and the frequencies $f_n$ are those used in equation (3) and $k_{max} \leq 10$ applies, and $$K = a^*SV + b^*SSG \quad (5)$$

where K is the parameter and where a and b are experimentally determined weighting factors.

6. The method as claimed in claim 1, wherein calculating the parameter comprises:

subjecting the structure-borne sound signal to a Fourier transformation;

determining amplitudes of the Fourier transform at a plurality of frequencies; and calculating the parameter from the amplitudes.

7. The method as claimed in claim 6, wherein a measure for a low-frequency scrap movement is calculated from amplitudes of the Fourier transform at frequencies f which lie below a fundamental frequency $f_0$, a measure for a high frequency vibration is calculated from amplitudes of the Fourier transform at frequencies f which lie above the fundamental frequency $f_0$ and do not include harmonic frequencies $mf_0$, a measure which characterizes stability of the electric arc is calculated from amplitudes of the Fourier transform at frequencies f which lie at and between the harmonic frequencies $mf_0$, and the parameter is calculated from the measures.

8. The method as claimed in claim 7, wherein the parameter is determined using:

$$SV = B * E \quad (1)$$

where $$B = \sum_{n=n0}^{n1} F^{-\alpha}(f_n) \quad (2)$$

where B is the measure for a low-frequency scrap movement, where E is the measure for a high frequency vibration, where F is the Fourier transform, where $f_{n1} < f_0$ and $f_{n+1} - f_n = \Delta f \ll f_0$
and where $$E = \sum_{n=n2}^{n3} F^{\beta}(f_n) \quad (3)$$

where $f_n \neq m^*f_0$ and $f_{n2} > f_0$, $2 \leq \beta \leq 10$ and m is a natural number,
and $$SSG = \left(\sum_{k=2}^{k_{max}} F(kf_0)\right) * \left(\sum_n F(f_n)\right) \bigg/ F^2(f_0) \quad (4)$$

where SSG is the measure which characterizes stability of the electric arc, where $f_n \neq m^*f_0$ and $f_n > f_0$, where k and m are natural numbers and the frequencies $f_n$ are those used in equation (3) and $k_{max} \leq 10$ applies, and $$K = a^*SV + b^*SSG \quad (5)$$

where K is the parameter and where a and b are experimentally determined weighting factors.

9. A smelting plant with an electric arc furnace, the electric arc furnace comprising:

an electrode operated using an alternating current;
a wall;
a structure-borne sound sensor arranged on the wall, to sense structure-borne sound signals of the electric arc furnace; and
a control and analysis device to analyze the structure-borne sound signals, to calculate a parameter which characterizes flicker properties of the electric arc furnace and to control a process variable for the electric arc furnace by reference to the parameter to avoid flicker,
wherein the flicker properties include a flicker value which corresponds to a variation in light intensity from a light source over time caused by fluctuations of voltage in the electric arc furnace.

10. The smelting plant of claim 9, wherein a plurality of structure-borne sound sensors are arranged at different locations on the wall, to sense structure-borne sound signals of the electric arc furnace.

11. The smelting plant of claim 9, wherein the control and analysis device is configured to calculate a parameter that predicts the flicker value based on a first value corresponding to a degree of scrap movement, a second value corresponding to a degree of scrap vibration, and a third value corresponding to a content of the scrap.

12. The smelting plant of claim 11, wherein the parameter is calculated based on a product of the first value and the second value.

* * * * *

UNITED STATES PATENT AND TRADEMARK OFFICE
CERTIFICATE OF CORRECTION

PATENT NO. : 9,949,322 B2
APPLICATION NO. : 14/233886
DATED : April 17, 2018
INVENTOR(S) : Arno Doebbeler et al.

It is certified that error appears in the above-identified patent and that said Letters Patent is hereby corrected as shown below:

In the Claims

Column 7, Line 24,
In Claim 5, delete "$f_{n2}>f_0$," and insert -- $f_{n2}>f_0$ where --, therefore.

Column 7, Line 39,
In Claim 5, delete "$K=\alpha$" and insert -- $K=a$ --, therefore.

Column 8, Line 23,
In Claim 8, delete "$f_{n2}>f_0$," and insert -- $f_{n2}>f_0$ where --, therefore.

Column 8, Line 38,
In Claim 8, delete "$K=\alpha$" and insert -- $K=a$ --, therefore.

Signed and Sealed this
Third Day of July, 2018

Andrei Iancu
*Director of the United States Patent and Trademark Office*